US010680740B2

(12) United States Patent
Zhang et al.

(10) Patent No.: US 10,680,740 B2
(45) Date of Patent: Jun. 9, 2020

(54) METHOD AND APPARATUS FOR DETERMINING A MODULATION SCHEME IN DIRECT LINK-BASED COMMUNICATION

(71) Applicant: Telefonaktiebolaget LM Ericsson (publ), Stockholm (SE)

(72) Inventors: Zhang Zhang, Beijing (CN); Mikael Fallgren, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/765,247

(22) PCT Filed: Mar. 12, 2018

(86) PCT No.: PCT/CN2018/078744
§ 371 (c)(1),
(2) Date: Mar. 30, 2018

(87) PCT Pub. No.: WO2018/171460
PCT Pub. Date: Sep. 27, 2018

(65) Prior Publication Data
US 2019/0068312 A1 Feb. 28, 2019

(30) Foreign Application Priority Data

Mar. 24, 2017 (WO) ............... PCT/CN2017/078150

(51) Int. Cl.
*H04L 1/00* (2006.01)
*H04W 4/40* (2018.01)
*H04W 92/18* (2009.01)

(52) U.S. Cl.
CPC .......... *H04L 1/0005* (2013.01); *H04L 1/0033* (2013.01); *H04W 4/40* (2018.02); *H04W 92/18* (2013.01)

(58) Field of Classification Search
CPC ... H04L 1/0005; H04L 1/0033; H04L 1/0003; H04W 4/40; H04W 92/18; H04W 4/46; H04W 4/48
See application file for complete search history.

(56) References Cited

U.S. PATENT DOCUMENTS 9,197,385 B2 * 11/2015 Khoshnevis .......... H04L 5/0048
2004/0192218 A1 * 9/2004 Oprea ............... H04L 25/03343
455/73

(Continued)

FOREIGN PATENT DOCUMENTS

CN 101754289 A 6/2010
CN 105144817 A 12/2015

(Continued)

OTHER PUBLICATIONS

Orsino et al. "Efficient Data Uploading Supported by D2D Communications in LTE-A Systems", Mar. 31, 2015, IEEE, pp. 1-6.*

(Continued)

*Primary Examiner* — Sophia Vlahos
(74) *Attorney, Agent, or Firm* — NDWE LLP

(57) ABSTRACT

Method and apparatus for determining a modulation scheme in direct link-based communication. A method implemented in a transmitting (TX) terminal device is provided. According to the method, a link quality of a direct link for transmission of information from the TX terminal device to one or more receiving (RX) terminal devices is determined based on one or more of the following: a context of the TX terminal device, or one or more reference signal received qualities (RSRQs) from the one or more RX terminal devices. A modulation scheme for modulating the information is determined based on the link quality. The information is modulated with the determined modulation scheme and (Continued)

the modulated information is transmitted to the one or more RX terminal devices via the direct link.

12 Claims, 3 Drawing Sheets

(56) References Cited

U.S. PATENT DOCUMENTS

| | | | |
|---|---|---|---|
| 2007/0066242 A1 | 3/2007 | Yi et al. | |
| 2007/0071149 A1* | 3/2007 | Li | H04B 7/0805 375/347 |
| 2009/0124300 A1* | 5/2009 | Park | H04B 7/0413 455/574 |
| 2010/0159935 A1* | 6/2010 | Cai | H04W 72/042 455/450 |
| 2016/0295624 A1 | 10/2016 | Novlan et al. | |
| 2018/0198580 A1* | 7/2018 | Nammi | H04L 27/0012 |
| 2018/0242190 A1* | 8/2018 | Khoryaev | H04W 28/0284 |
| 2018/0302752 A1* | 10/2018 | Ueno | H04W 4/08 |

FOREIGN PATENT DOCUMENTS

| | | | | |
|---|---|---|---|---|
| CN | 105208618 A | 12/2015 | | |
| WO | WO-2017171895 A1 * | 10/2017 | | H04L 1/0001 |

OTHER PUBLICATIONS

3GPP TS 22.185, "3rd Generation Partnership Project; Technical Specification Group Services and System Aspects; Service requirements for V2X services; Stage 1 (Release 14)," Nov. 2016, 14 pages, V14.2.1, 3GPP Organizational Partners.

3GPP TS 36.302, "3rd Generation Partnership Project; Technical Specification Group Radio Access Network; Evolved Universal Terrestrial Radio Access (E-UTRA); Services provided by the physical layer (Release 14)," Dec. 2016, 29 pages, V14.1.0, 3GPP Organizational Partners.

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 14)," Dec. 2016, 654 pages, V14.1.0, 3GPP Organizational Partners.

Huawei et al., "New WID on 3GPP V2X Phase 2," Mar. 6-9, 2017, 8 pages, 3GPP TSG RAN Meeting #75, RP-170798, Dubrovnik, Croatia.

"RAN1 Chairman's Notes," May 23-27, 2016, 126 pages, 3GPP TSG RAN WG1 Meeting #85, Nanjing, China.

"RAN1 Chairman's Notes," Nov. 14-18, 2016, 115 pages, 3GPP TSG RAN WG1 Meeting #87, Reno, Nevada, USA.

International Search Report and Written Opinion for Application No. PCT/CN2018/078744, dated Jun. 1, 2018, 9 pages.

International Preliminary Report on Patentability for International Application No. PCT/CN2018/078744, dated Oct. 3, 2019, 5 pages.

"Discussion of transmission parameters range of PSSCH," 3GPP TSG RAN WG1 Meeting #86, R1-167151, Gothenburg, Sweden, Aug. 22-26, 2016, 7 pages, Huawei, HiSilicon.

"Discussion on V2V UE Rx RF requirements at 5.9GHz," 3GPP TSG-RAN WG4 Meeting #80, R4-165957, Gothenburg, SE, Aug. 22-26, 2016, 5 pages, Samsung.

Extended European Search Report for EP Application No. 18771140.3, dated Feb. 19, 2020, 12 pages.

Piro et al., "D2D in LTE vehicular networking: system model and upper bound performance," 2015 7th International Congress on Ultra Modern Telecommunications and Control Systems and Workshops (ICUMT), 6 pages.

* cited by examiner

METHOD AND APPARATUS FOR DETERMINING A MODULATION SCHEME IN DIRECT LINK-BASED COMMUNICATION

CROSS-REFERENCE TO RELATED APPLICATIONS

This application is a National stage of International Application No. PCT/CN2018/078744, filed Mar. 12, 2018, which claims priority to International Application No. PCT/CN2017/078150, filed Mar. 24, 2017, which are hereby incorporated by reference.

TECHNICAL FIELD

Embodiments of the present disclosure generally relate to the field of telecommunication, and in particular, to a method and apparatus for determining a modulation scheme in direct link based communication.

BACKGROUND

Device to device (D2D) communication has been developed for years and have been extended to include vehicle-to-anything (V2X) communication. For example, in current telecommunication specifications such as the 3rd Generation Partnership Project (3GPP) specification Release 14, the extensions for the D2D work consist of support of V2X communication. V2X communication includes any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N). V2V communication includes communication between vehicles; V2P communication includes communication between a vehicle and a device carried by an individual (for example, a handheld user terminal carried by a pedestrian, cyclist, driver, or passenger); V2I communication includes communication between a vehicle and infrastructures supporting V2X applications, such as roadside units (RSUs) which are transportation infrastructure entities; and V2N communication includes communication between a vehicle and network infrastructures such as a network terminal.

V2X communication may take advantage of a network (NW) infrastructure, when available, but at least basic V2X connectivity should be possible even in case of lack of network coverage. Providing a V2X interface based on networks (such as a Long Term Evolution (LTE)-based V2X interface) may be economically advantageous (especially because of the LTE economies of scale) and may enable tighter integration between V2I, V2P, and V2V communications, as compared to using a dedicated V2X technology. Therefore, V2I, V2P, and V2V communications can be performed via Uu interfaces or direct links therebetween (also referred to as sidelinks), while V2N communication is performed via Uu interfaces since network devices are involved.

In use cases of communication based on direct links (or sidelinks), a transmitting (TX) terminal device broadcasts information to surrounding receiving (RX) terminal devices via the direct links, and the RX terminal devices try to detect the broadcast information over all resources. It is required that the RX terminal devices within a certain communication range of the TX terminal devices should be able to detect the information with sufficiently high probability. The information is modulated by the TX terminal device before being broadcasted. As specified in current communication specifications, only some low order modulation schemes such as Quadrature Phase Shift Keying (QPSK) modulation and 16 Quadrature Amplitude Modulation (16QAM) modulation are currently supported for V2X communications.

SUMMARY

In general, example embodiments of the present disclosure provide a method and apparatus for determining a modulation scheme in direct link-based communication.

In a first aspect, there is provided a method implemented in a transmitting, TX, terminal device. According to the method, a link quality of a direct link for transmission of information from the TX terminal device to one or more receiving, RX, terminal devices is determined based on one or more of the following: a context of the TX terminal device, or one or more reference signal received qualities, RSRQs, from the one or more RX terminal devices. A modulation scheme for modulating the information is determined based on the link quality. The information is modulated with the determined modulation scheme and the modulated information is transmitted to the one or more RX terminal devices via the direct link.

In some embodiments, determining the modulation scheme comprises in response to the link quality exceeding a threshold quality, determining a modulation scheme having an order higher than an order of 16 Quadrature Amplitude Modulation, 16QAM, scheme for modulating the information.

In some embodiments, determining the modulation scheme comprises in response to the link quality exceeding a threshold quality, determining a modulation scheme having an order equal to or higher than an order of a 64QAM scheme for modulating the information.

In some embodiments, modulating the information with the determined modulation scheme further comprises: in response to determining a modulation scheme having an order higher than an order of a 16QAM scheme, or in response to determining a modulation scheme having an order equal to or higher than an order of a 64QAM scheme, transmitting an indication of use of the modulation scheme to a network device serving the TX terminal device; and in response to receiving a confirmation from the network device, modulating the information with the determined modulation scheme.

In some embodiments, determining the modulation scheme further comprises: determining the modulation scheme further based on a resource pool for the transmission of the information.

In some embodiments, determining the modulation scheme further based on the resource pool comprises: determining a modulation scheme having an order equal to or lower than an order of a 16QAM scheme for modulating the information based on determining that the resource pool is one of: a resource pool without sensing, a resource pool on a high frequency band, or a resource pool reserved for a legacy transmission.

In some embodiments, determining the modulation scheme further based on the resource pool comprises: determining a modulation scheme having an order lower than an order of a 64QAM scheme for modulating the information based on determining that the resource pool is one of: a resource pool without sensing, a resource pool on a high frequency band, or a resource pool reserved for a legacy transmission.

In some embodiments, determining the modulation scheme further comprises: determining the modulation scheme further based on one or more of a reliability requirement or a latency requirement for a service on the TX terminal device from which the information is originated.

In some embodiments, the context of the TX terminal device includes one or more of: a position of the TX terminal device; a speed of the TX terminal device; an acceleration of the TX terminal device; a propagation environment of the information from the TX terminal device; or a communication range required for the transmission of the information by the TX terminal device.

In some embodiments, the context of the TX terminal device includes the propagation environment, the method further comprising: receiving an indication from a network device serving the TX terminal device, the indication indicting the prorogation environment.

In some embodiments, the indication indicates whether there is an object blocking propagation of the information from the TX terminal device to one of the one or more RX terminal devices.

In some embodiments, the method further comprises: measuring candidate RSRQs from a plurality of candidate RX terminal devices; determining respective distances from the TX terminal device to the candidate RX terminal devices; identifying one or more of the plurality of candidate RX terminal devices having the determined distances within a communication range required for the transmission of the information; and determining one or more of the candidate RSRQs from the identified one or more candidate RX terminal devices as the one or more RSRQs.

In some embodiments, determining the respective distances comprises: identifying resource pools in which receptions of reference signals from the plurality of candidate RX terminal devices are detected; determining a plurality of geological zones to which the resource pools are allocated; and determining the respective distances from the TX terminal device to the plurality of candidate RX terminal devices based on the determined geological zones.

In a second aspect, there is provided an apparatus at a TX terminal device. The apparatus comprises a processing unit; and a memory coupled to the processing unit and storing instructions thereon, the instructions, when executed by the processing unit, causing the apparatus to determine a link quality of a direct link for transmission of information from the TX terminal device to one or more RX terminal devices, based on one or more of the following: a context of the TX terminal device, or one or more reference signal received qualities, RSRQs, from the one or more RX terminal devices. The instructions, when executed by the processing unit, also cause the apparatus to determine, based on the link quality, a modulation scheme for modulating the information. The instructions, when executed by the processing unit, further cause the apparatus to modulate the information with the determined modulation scheme; and transmit the modulated information to the one or more RX terminal devices via the direct link.

In some embodiments, the instructions, when executed by the processing unit, cause the apparatus to: in response to the link quality exceeding a threshold quality, determine a modulation scheme having an order higher than an order of 16 Quadrature Amplitude Modulation, 16QAM, scheme for modulating the information In some embodiments, the instructions, when executed by the processing unit, cause the apparatus to: in response to the link quality exceeding a threshold quality, determine a modulation scheme having an order equal to or higher than an order of a 64QAM scheme for modulating the information.

In some embodiments, the instructions, when executed by the processing unit, cause the apparatus to: in response to determining a modulation scheme having an order higher than an order of a 16QAM scheme, or in response to determining a modulation scheme having an order equal to or higher than an order of a 64QAM scheme, transmit an indication of use of the modulation scheme to a network device serving the TX terminal device; and in response to receiving a confirmation from the network device, modulate the information with the determined modulation scheme.

In some embodiments, the instructions, when executed by the processing unit, further cause the apparatus to: determine the modulation scheme further based on a resource pool for the transmission of the information.

In some embodiments, the instructions, when executed by the processing unit, cause the apparatus to: determine a modulation scheme having an order equal to or lower than an order of a 16QAM scheme for modulating the information based on determining that the resource pool is one of: a resource pool without sensing, a resource pool on a high frequency band, or a resource pool reserved for a legacy transmission.

In some embodiments, the instructions, when executed by the processing unit, cause the apparatus to: determine a modulation scheme having an order lower than an order of a 64QAM scheme for modulating the information based on determining that the resource pool is one of: a resource pool without sensing, a resource pool on a high frequency band, or a resource pool reserved for a legacy transmission.

In some embodiments, the instructions, when executed by the processing unit, further cause the apparatus to: determine the modulation scheme further based on one or more of a reliability requirement or a latency requirement for a service on the TX terminal device from which the information is originated.

In some embodiments, the context of the TX terminal device includes one or more of: a position of the TX terminal device; a speed of the TX terminal device; an acceleration of the TX terminal device; a propagation environment of the information from the TX terminal device; or a communication range required for the transmission of the information by the TX terminal device.

In some embodiments, the context of the TX terminal device includes the propagation environment, and the instructions, when executed by the processing unit, further cause the apparatus to: receive an indication from a network device serving the TX terminal device, the indication indicting the prorogation environment.

In some embodiments, the indication indicates whether there is an object blocking propagation of the information from the TX terminal device to one of the one or more RX terminal devices.

In some embodiments, the instructions, when executed by the processing unit, further cause the apparatus to: measure candidate RSRQs from a plurality of candidate RX terminal devices; determine respective distances from the TX terminal device to the candidate RX terminal devices; identify one or more of the plurality of candidate RX terminal devices having the determined distances within a communication range required for the transmission of the information; and determine one or more of the candidate RSRQs from the identified one or more candidate RX terminal devices as the one or more RSRQs.

In some embodiments, the instructions, when executed by the processing unit, cause the apparatus to: identify resource pools in which receptions of reference signals from the plurality of candidate RX terminal devices are detected; determine a plurality of geological zones to which the resource pools are allocated; and determine the respective distances from the TX terminal device to the plurality of candidate RX terminal devices based on the determined geological zones.

In a third aspect, there is provided a computer program product that is tangibly stored on a computer readable storage medium. The computer program product includes instructions which, when executed on at least one processor, cause the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
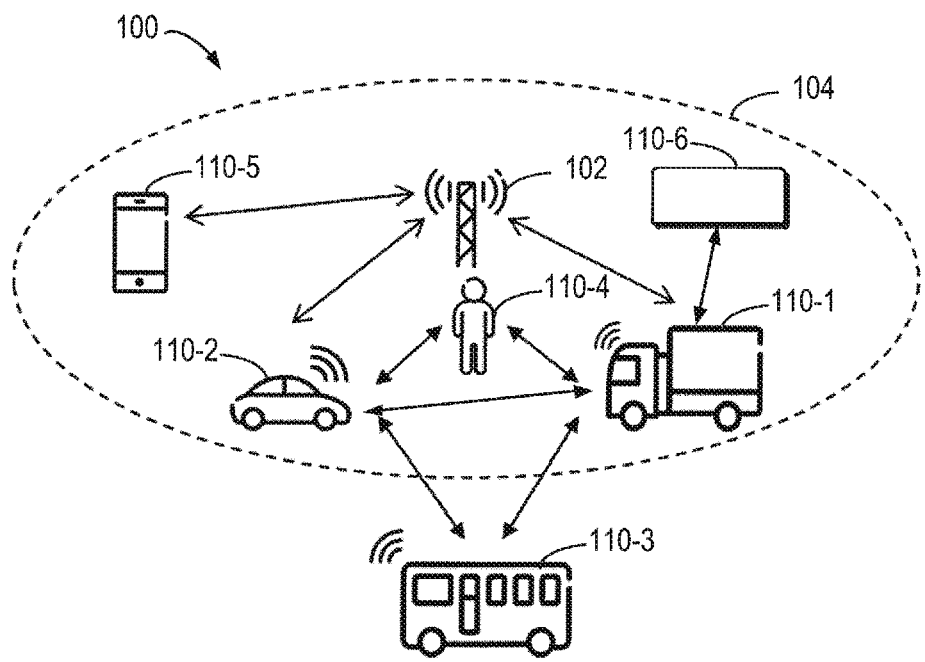
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. In use cases of V2X communications, examples of the terminal device also include computers embedded in vehicles, and any V2X capable infrastructures deployed in an environment.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication environment 100 in which embodiments of the present disclosure can be implemented. In the environment 100, vehicles 110-1, 110-2, and 110-3, a pedestrian 110-4, a mobile phone 110-5, and an infrastructure 110-6 (in this example, a roadside unit (RSU)) are terminal devices (collectively or individually referred to as terminal device 110) and can communicate with each other. A cellular network device 102 is also deployed in the environment and provides services to those terminal devices that are in its coverage 104 (also referred to as a cell 104) and access to the cellular network. It would be appreciated that the terminal devices, the network device, and the links therebetween are shown merely for illustration. There may be various other terminal devices and network devices in V2X communication in many other ways.

The environment 100 illustrates a scenario of V2X communication where vehicles and any other devices can communicate with each other. As mentioned above, V2X communication can be divided into four types, including Vehicle-to-Vehicle (V2V), Vehicle-to-Pedestrian (V2P), Vehicle-to-Infrastructure (V2I), Vehicle-to-Network (V2N). Communication between terminal devices 110 (that is, V2V, V2P, V2I communications) can be performed via both Uu interface and direct links (or sidelinks), while communication involving the network device 102 (that is, V2N communication) can be performed only via the Uu interfaces. For sidelink-based V2X communication, information is transmitted from a TX terminal device to one or more RX terminal devices in a broadcast manner. In all the four types of V2X communications, only low order modulation schemes having an order equal to or lower than an order of 16QAM, such as the modulation schemes of QPSK and 16 QAM, are allowed to be used.

Further enhancements on the V2X communications are focusing on additional V2X operation scenarios leveraging the cellular infrastructures. In current 3GPP works, a work group (for example, SA1) is working on enhancement of 3GPP support for V2X services in FS_eV2X. SA1 had identified 25 use cases for advanced V2X services which are categorized into four use case groups: vehicles platooning, extended sensors, advanced driving and remote driving. The consolidated requirements for each use case group are captured in the specification (for example, TR 22.886). For these advanced applications, the expected requirements to meet the needed data rate, reliability, latency, communication range and speed are made more stringent. To support these advanced V2X services, a new work item on 3GPP V2X Phase 2 is started. The work item will specify solutions for the following interface functionalities on sidelinks (also called PC5), which can co-exist in the same resource pools as current 3GPP Release 14 sidelink functionality and use the same scheduling assignment format (which can be decoded by Rel-14 UEs), without causing significant degradation to Rel-14 PC5 operation compared to that of Rel-14 UEs. The four interface functionalities include carrier aggregation (up to 8 PC5 carriers); high order modulation (for example, 32QAM or 64QAM); reducing the maximum time between packet arrival at Layer 1 and resource selected for transmission; and radio resource pool sharing between terminal devices using Mode 3 and UEs using Mode 4.

As can be seen, high order modulation is one of the desired improvements in V2X communication. However, good link quality is required in applying high order modulation such as 32QAM or 64QAM. Improper use of high order modulation cannot improve spectrum efficiency, but may instead decrease reliability and increase latency, while high reliability and low latency are crucial in many V2X use cases. In communications involved the network side (such as V2N communication and other cellular communication), the network device can adapt the modulation scheme based on feedback from the terminal devices. Such modulation adaptation method cannot be directly used in the sidelink-based V2X communication where transmission and reception are performed in a broadcast manner and there is no connection established between TX terminal device and RX terminal device(s).

In order to exploit benefits from a high order modulation scheme in sidelink-based V2X communication without scarifying other key performance indicators such as latency, reliability, and capability, there is a need to determine whether a link quality of a sidelink is of high quality and suitable for applying the high order modulation scheme. According to embodiments of the present disclosure, there is provided a solution for determining a modulation scheme in V2X communication. Specifically, a TX terminal device measures or estimates a link quality of a sidelink from the TX terminal devices to one or more RX terminal devices based on a context of the TX terminal device and/or RSRQs from the one or more RX terminal devices. Depending on the link quality, the TX terminal device can be able to determine whether a high order modulation scheme can be applied to modulate information to be transmitted to the one or more RX terminal device. As used herein, a "high order modulation scheme" refers to a modulation scheme having an order higher than orders of modulation schemes that are allowed according to current specifications for V2X communication. In some embodiments, a "high order modulation scheme" has an order higher than an order of 16QAM, in particular equal to or higher than an order of 64QAM.

Figure 2:
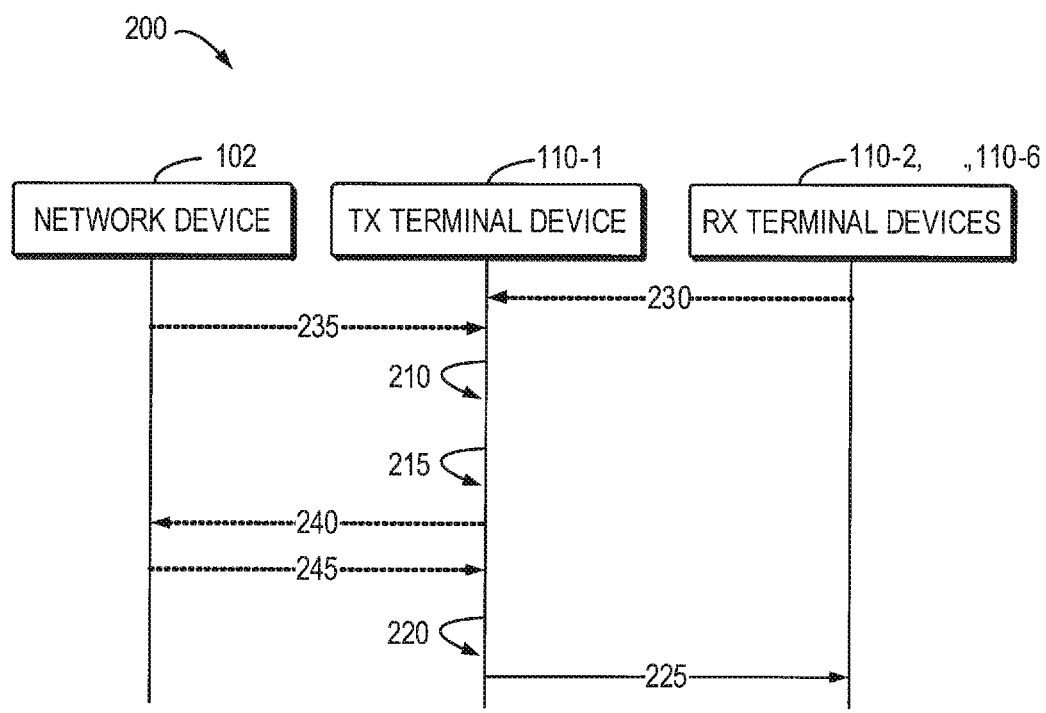
FIG. 2 is a flowchart illustrating a process for modulation determination according to some other embodiments of the present disclosure.

Principle and implementations of the present disclosure will be described in detail below with reference to FIG. 2, which shows a process 200 for modulation determination according to an embodiment of the present disclosure. For the purpose of discussion, the process 200 will be described with reference to FIG. 1. The process 200 may involve modulation determination and information transmission in V2X communication. In embodiments of FIG. 2, the terminal device 110-1 has information to be broadcasted. In this case, the terminal device 110-1 acts as a TX terminal device. The information may include any safety and/or non-safety information that the TX terminal device 110-1 wants or is required to broadcast. Terminal devices surrounding the TX terminal device such as terminal devices 110-2, . . . , 110-6 may detect the information broadcasted by the TX terminal device 110-1 and thus can be called as RX terminal devices 110-2, . . . , 110-6. In some embodiments, as will be discussed below, the TX terminal device 110-1 may transmit/receive other indication or information to/from the network device 102. It would be appreciated that FIG. 2 is merely illustrated as an example and any terminal device 110 in FIG. 1 can act as a TX terminal device to broadcast its information if any.

The TX terminal device 110-1 determines (210) a link quality of a direct link for transmission of information from the TX terminal device 110-1 to the RX terminal devices 110-2, . . . , 110-6 based on one or more of the following: a context of the TX terminal device, or one or more reference signal received qualities (RSRQs) from the RX terminal devices 110-2, . . . , 110-6. A direct link (also referred to as a sidelink) between a TX terminal device to a RX terminal device is a connectionless link, which means that no connectivity is established before the TX terminal device transmits the information. Thus, based on such a direct link, the TX terminal device may broadcast information in a certain resource pool it selects and one or more RX terminal devices may scan all possible resources to detect the broadcasted information.

In some examples, in order to ensure the V2X communication quality, the communication specifications have specified that information broadcasted from a TX terminal device should be at least detected by RX terminal devices within a predetermined communication range to have a good quality. In the environment 100 of FIG. 1, it is supposed that terminal devices 110-2, . . . , 110-6 are all within the communication range required for the TX terminal device 110-1. This communication range may be varied based on the type of the TX terminal device and/or the service from which the information to be broadcasted is originated on the TX terminal device 110-1. For example, if the information to be broadcasted by the TX terminal device 110-1 is originated from a V2X service responsible for broadcasting an indication of a high speed of the TX terminal device 110-1, then the communication range required for this information is limited. In some other examples, the communication range for the TX terminal device 110-1 may be fixed.

In determining the link quality, the context of the TX terminal device 110-1 may be used to describe an internal condition of the TX terminal device 110-1 per se and/or an external condition where the TX terminal device 110-1 is located. In some embodiments, the internal condition of the TX terminal device 110-1 may include a position, an acceleration, and/or a speed of the TX terminal device 110-1. The external condition of the TX terminal device may include a propagation environment of the information from the TX terminal device 110-1 and/or a communication range required for the transmission of the information by the TX terminal device.

In addition to the context of the TX terminal device 110-1, in determining the link quality, the TX terminal device 110-1 may also take the RSRQs from the RX terminal devices 110-2, . . . , 110-6 into account. Some terminal devices may transmit reference signals on respective resource pools. Such reference signal may also be referred to as sidelink control information (SCI). The TX terminal device 110-1 may receive (230) the reference signals from some terminal device in proximity by performing sensing on the respective direct links. The TX terminal device 110-1 may measure received qualities of the reference signals and use the measurements to determine the link quality for transmission of its information. A received quality of a reference signal (RSRQ) from a terminal device may be measured by the received power, the signal strength, or other parameters that can reflect the quality. A RSRQ may also reflect the condition of a direct link from the TX terminal device 110-1 to one of the RX terminal devices 110-2, . . . , 110-6.

In some embodiments, the TX terminal device 110-1 may estimate a link quality of a respective direct link between the TX terminal device 110-1 to each of the RX terminal devices 110-2, . . . , 110-6 and the overall link quality for transmission of the information may be obtained based on the quality of those direct links. How the link quality is measured based on the context factors (the position, speed, acceleration, propagation environment, and communication range) and the RSRQ measurements will be described in detail below.

After determining the link quality, the TX terminal device 110-1 determines (215), based on the link quality, a modulation scheme for modulating the information to be broadcasted. In V2X communication, a direct link is of high quality if there is line of sight transmission between a TX terminal device and a RX terminal device, while the direct link may be considered as of bad quality if the transmission becomes non-line of sight. According to embodiments of the present disclosure, if the link quality of the direct link for transmission of the information to the RX terminal device 110-2, . . . , 110-6 is determined as high (for example, higher than a threshold quality), the TX terminal device 110-1 may be able to apply a high order modulation scheme, such as a 32QAM, 64QAM scheme, or higher. Otherwise, normal low modulation schemes such as QPSK and 16QAM can be used to modulate the information in order to main the reliability and latency of the transmission of the information. In some embodiments, the overall link quality for the TX terminal device 110-1 may be measured as specific values or may be categorized into one of quality classes (for example, classes of high, middle, or low qualities). Thus, the threshold quality may be set accordingly to compare with the determined link quality.

The TX terminal device 110-1 modulates (220) the information with the determined modulation scheme and transmits or broadcasts (225) the modulated information to the RX terminal devices 110-2, . . . , 110-6. Depending on the type of the information or the service originating the information, the modulated information may be transmitted in a message with a specific format. In transmitting the modulated information, the TX terminal device 110-1 may select a resource pool from a plurality of possible resource pools and transmit the modulated information using resources in the resource pool. In V2X communications, a geological coverage may be divided into several geological zones with specific lengths and widths, which can be identified by respective identities. As part of configuration, each of the geological zones may be allocated with a corresponding resource pool. To transmit information in V2X communication, the TX terminal device 110-1 may identify an identity of a geological zone where it is positioned and then select a resource pool allocated for this geological zone.

An example of determining a geological zone of a terminal device is provided as following.

$$x = \text{Floor}(x/L) \bmod N_x;$$

$$y = \text{Floor}(y/W) \bmod N_y;$$

$$\text{Zone\_id} = y \ast N_x + x. \quad (1)$$

Where L represents the zone length, W represents the zone width, Nx represents the total number of zones that is configured with respect to longitude, Ny represents the total number of zones that is configured with respect to latitude, x represents the distance in longitude between the current location of the terminal device and geographical coordinates (0, 0) and it is expressed in meters, y is the distance in latitude between the current location of the terminal device and geographical coordinates (0, 0) and it is expressed in meters, and Zone_id represents an identity of the geological zone of the terminal device. L, W, Nx and Ny are parameters included in the zone configuration. It would be appreciated that Equation (1) is provided merely for purpose of illustration. In other examples, other method may also be employed to determine a specific geologic zone where a terminal device is positioned.

As part of network configuration, each zone identity (Zone_id) may be allocated with a corresponding resource pool. In this way, in transmitting the modulated information, the TX terminal device 110-1 may identify which resource pool to be used if the zone identify is determined. In receiving the modulated information, since no negotiation of the used resources are performed before the transmission, the RX terminal devices 110-2, . . . , 110-6 may scan all possible resources and detect the modulated information on the resource pool used by the TX terminal device 110-1.

As mentioned above, in determining a link quality of a direct link, the context of the TX terminal device 110-1 including one or more of the position, speed, acceleration, propagation environment, and communication range may be used to estimate the link quality for transmission of the information of the TX terminal device 110-1. The influences of the above factors on the link quality are now described in more detail.

The position of the TX terminal device 110-1 may be obtained via a positioning module in the TX terminal device 110-1, for example, a global positioning system (GPS). As a V2X capable terminal device, the TX terminal device 110-1 generally may be capable of determining its precise position. In some other cases, if the TX terminal device 110-1 is a fixed device (a roadside unit), its fixed position may be preconfigured and stored. The speed is available for a mobile TX terminal device 110-1 such as a vehicle, a device held by a pedestrian, and the like. As a vehicle, the TX terminal device 110-1 can be equipped with a speed measurement meter to determine its speed. For a pedestrian with a limited movement speed, a predetermined fixed speed may be used. For some fixed TX terminal devices, their speeds may be set to be zero. Moreover, the acceleration of a TX terminal device may be detected or obtained by for example an equipped accelerator in the TX terminal device.

Figure 3:
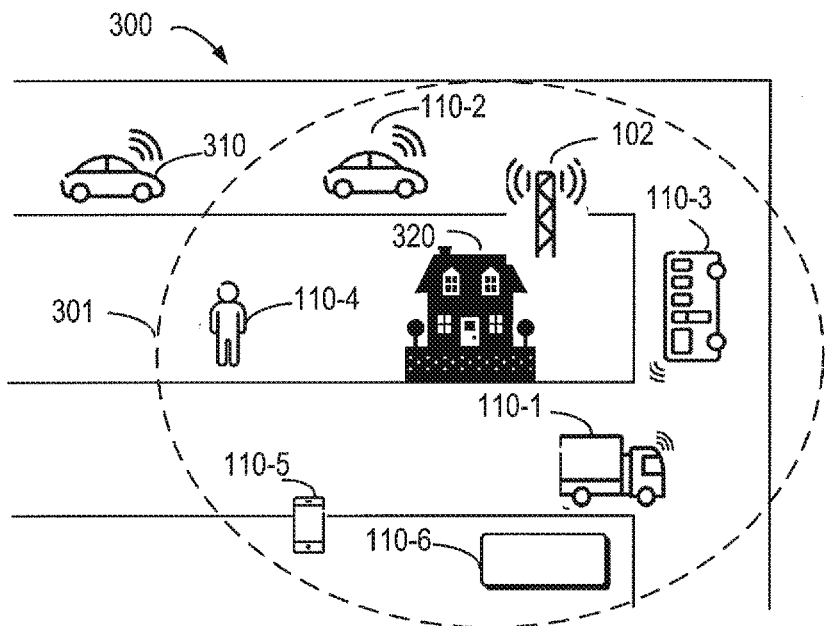
FIG. 3 is a scenario where terminal devices and network device are distributed in different places in roads and streets in accordance with some embodiments of the present disclosure.

The position, acceleration, and speed can be used to determine the environment where the TX terminal device 110-1 is located when it broadcasts the information, which is useful in estimating the link quality. For example, based on the position, acceleration, and speed, the TX terminal device 110-1 can determine that it is or is about to be in the vicinity of a street cross. Since the information will be broadcasted to more directions in a street cross and transmission to some of the RX terminals in the other street may not be line of sight transmission, the link quality of the direct link for the transmission of the information may not be high. FIG. 3 illustrates a scenario 300 where terminal devices 110 and network device 102 are distributed in different places in the roads and streets. As can be seen, the TX terminal device 110-1 is approaching to a street cross with a high speed, then the TX terminal device 110-1 can determine that the link quality of the direct link for the transmission of the information may not be high enough.

As another possible factor considered in determining the link quality, a propagation environment of the information from the TX terminal device 110-1 may indicate whether there is any object blocking propagation of the information from the TX terminal device 110-1 to one of the RX terminal devices 110-2, . . . , 110-6. The presence of an object, especially a huge and solid object, in the propagation path from the TX terminal device 110-1 to a RX terminal device 110-2, . . . , or 110-6 may destroy the line of sight transmission and thus reduce the link quality from that link between the TX and RX terminal devices. Generally, for TX terminal devices moving on streets or roads, the presence of a blocking object will occur in cases where a RX terminal device is in a different street of the TX terminal device. For example, in the scenario 300 of FIG. 3, the TX terminal device 110-1 detects that there is a building located in the propagation path to the RX terminal device 110-2 and thus the link quality between the two terminal devices may be determined as low.

In some embodiments, the propagation environment may be detected by the TX terminal device via equipped sensors, cameras, and/or information received from sensors deployed in the environment such as on the streets, roads, buildings, lamp posts, and the like. In some other embodiments, the propagation environment may be instructed by the network device 102. In these embodiments, the TX terminal device 110-1 receives (235) from the network device 102 serving the TX terminal device an indication indicating the prorogation environment.

In some examples, the indication from the network device 102 may be one-bit indication used to inform the TX terminal device 110-1 whether there is an object (a high building, for example) blocking propagation of the information from the TX terminal device to one of the one or more RX terminal devices. The network device 102 may inform that TX terminal device 110-1 of the blocking object in the cell for which it is serving and/or in a cell of its neighbor (in which case inter-cell coordination may be performed between the network device 102 and the neighbor network device). In some other examples, the indication may be provided in a finer granularity. For example, the network device 110-1 may determine a geological zone where the terminal device is located and provide the indication to indicate whether there is a blocking object in this geological zone (which may be smaller than the cell). An example of determining the geological zone for a terminal device has been be discussed above and thus omit here for brevity.

In some embodiments, as another factor in the context of the TX terminal device 110-1, the communication range is also useful in determining the link quality. A communication range, as mentioned above, is a required range for transmission of the information by the TX terminal device 110-1. In the example shown in FIG. 3, a communication range of the TX terminal device 110-1 is indicated as 301. In an embodiment, if the communication range indicates that the information is only needed to be transmitted to RX terminal devices within the street where the TX terminal device 110-1 is located, then the line of sight transmission can be satisfied and the TX terminal device 110-1 may determine that the link quality is high.

The communication range may also be used in combination with other factors such as the propagation environment, the speed and position of the TX terminal device 110-1 to measure the link quality. As an example, if the network device 102 indicates that there is a blocking object in the geological zone of the TX terminal device 110-1 while the communication range indicates that RX terminal devices on the other side of the blocking object are beyond the required communication range, then the TX terminal device 110-1 may determine whether there are any other factors reducing the link quality. If there is no such factor, then the link quality for the transmission of the information may be high.

The different possible factors included in the context of the TX terminal device 110-1 have been described above. In addition to the context of the TX terminal device 110-1 or as an alternative, RSRQs from the RX terminal devices may also be used to measure the link quality. A high RSRQ may indicate that the link from the RX terminal device to the TX terminal device 110-1 is in a good condition for transmission. The link quality based on the RSRQs from all the RX terminal devices 102-2, . . . , 102-6 may be determined to indicate the overall link quality for transmission of the information alone or in combination with other quality metrics (such as those determined from the context of the TX terminal device 110-1).

In some cases, the TX terminal device 110-1 may detect reference signals from RX terminal devices that are not in the communication range of the TX terminal device 110-1. For example, in the scenario 300 of FIG. 3, the TX terminal device 110-1 receives references from RX terminal device 110-2, . . . , 110-6, and 310, where the terminal device 310 is out of the communication range 301 of the TX terminal device 110-1. In this case, among all the RSRQs (referred to as candidate RSRQs) measured by the TX terminal device 110-1 from a plurality of RX terminal devices (referred to as candidate RX terminal devices), the TX terminal device 110-1 may filter out candidate RSRQs from candidate RX terminal devices that are out of the communication range and only use the remaining candidate RSRQ to estimate the link quality for the transmission of the information. The candidate RSRQs from candidate RX terminal devices out of the communication range may be filtered based on their distances to the TX terminal device 110-1.

Specifically, the TX terminal device 110-1 determines respective distances from the TX terminal device 110-1 to the candidate RX terminal devices from which the reference signals are detected. Then the TX terminal device 110-1 may identify one or more of the candidate RX terminal devices having the determined distances within the required communication range. For example, the communication range may be indicated as a radius distance from the TX terminal device 110-1. If the determined distance for a candidate RX terminal device is equal to or lower than that radius distance, the TX terminal device 110-1 may determine that the candidate RX terminal device is within its communication range. The TX terminal device 110-1 may determine one or more candidate RSRQs from the one or more candidate RX terminal devices within the communication range and use the determined candidate RSRQ to measure the link quality. The remaining candidate RSRQs may be dropped or may be maintained for other use. For example, in the scenario 300 of FIG. 3, only RSRQs from the RX terminal devices 110-2, . . . , 110-6 are used by the TX terminal device 110-1 while the RSRQ from the RX terminal device 310 is filtered out in determining the link quality.

In some embodiments, the TX terminal device 110-1 may employ an indirect manner to derive a distance between the TX terminal device 110-1 and a candidate RX terminal device based on a resource pool used by the candidate RX terminal device to transmit the corresponding reference signal. As mentioned above, each terminal device in V2X communication can identify its geological area so as to determine the resource pool for information transmission. The TX terminal device 110-1 may not be able to directly identify the geological zone of a certain RX terminal device from which it detects a reference signal, but may be able to identify the resource pool in which the reference signal is transmitted and thus derive the geological zone based on the predetermined mapping between the geological zones and resource pools. Since the division of geological zones is preconfigured and fixed in a certain geological coverage, the TX terminal device 110-1 can estimate the distance from its position or geological zone to the geological zone of the RX terminal device from which it detects a reference signal. In this way, the TX terminal device 110-1 can determine respective distances of the candidate RX terminal devices.

It would be appreciated that although it has been discussed above that the distances between the TX terminal device 110-1 and the RX terminal devices are determined based on resource pools used by the RX terminal devices, in other examples, the TX terminal device 110-1 may also determine the distances in other manners. For example, the TX terminal may store positions of some RX terminal devices and thus can directly calculate the distance based on the stored positions of the RX terminal devices and its own position. The scope of the present disclosure is not limited in this regard.

Various factors that may affect the link quality of TX terminal device 110-1 have been discussed above. It would be appreciated that these factors may be independently or jointly used by the TX terminal device 110-1 to estimate its link quality. The scope of the present invention is not limited in this regard.

In some further embodiments, in addition to the link quality, some additional rules can also be applied to determine whether a high order modulation scheme can be used by the TX terminal device 110-1, so as to further facilitate satisfaction of the requirements in various aspects of the V2X communication. As an example, instead of directly deciding to apply the high order modulation scheme when determining that the link quality exceeds a threshold quality, the TX terminal device 110-1 may determine the modulation scheme further based on a resource pool for the transmission of the information. The resource pool, as discussed above, is determined depending on the geological zone of the TX terminal device 110-1. In some cases, there may be some criteria to define which resource pool can be used for transmission information modulated with a high order modulation scheme while which resource pool cannot.

In an embodiment, if the TX terminal device 110-1 determines, based on its geological zone, to use a resource pool that is reserved for legacy transmission, then the high order modulation scheme cannot be applied in this resource pool because usually the legacy transmission cannot support high order modulation. In another embodiment, a resource pool on certain carrier frequency such as on a high frequency band cannot support the high order modulation scheme. As yet another embodiment, a resource pool without sensing (for example, an exception resource pool, a V2P resource pool with random selection) does not support the high order modulation scheme. Therefore, even if the TX terminal device 110-1 determines that the link quality is high, when the resource pool on the high frequency band or resource pool without sensing is allocated for the TX terminal device 110-1, the TX terminal device 110-1 may also decide not to use the high order modulation scheme to modulate the information.

The indication of which resource pool allows or does not allow the high order modulation scheme may be configured with the TX terminal device 110-1 or may be determined based on an indication from the network device 102. For example, the network device 102 may use a one-bit indication to indicate whether the high order modulation scheme is allowed or not in each resource pool. The network device 102 may also indicate to the TX terminal device 110-1 that a certain type of resource pool (for example, an exception resource pool or a V2P resource pool with random selection) is not allowed or a resource pool with a certain characteristic (for example, a resource pool without sensing or a resource pool on a high frequency band) is not allowed.

Alternatively, or in addition, the TX terminal device 110-1 may determine the modulation scheme based on a reliability requirement and/or a latency requirement of a service on the TX terminal device 110-1 from which the information is originated. Such a service may also be referred to as a V2X service. There is a possibility that the use of the high order modulation scheme may introduce latency and reduce reliability for the information transmission. Therefore, if the information to be transmitted is generated from a service with high requirements on reliability and/or latency, the TX terminal device 110-1 may determine not to use the high order modulation scheme but instead choose a normal low order modulation scheme. In some embodiments, the network device 102 may indicate to the TX terminal device 110-1 a list of V2X services for which a high order modulation scheme can or cannot be used. In other embodiments, the network device 102 may provide the TX terminal device 110-1 with information on the characteristics of the V2X services (the reliability and latency requirements of the services) for which a high order modulation scheme can or cannot be used.

In some embodiments, the TX terminal device 110-1 can make a decision of using the high order modulation by itself. In some other embodiments, if the TX terminal device 110-1 determines that a high order modulation scheme can be applied based on the link quality and/or the rules on the resource pool and the service, it may transmit (240) an indication of use of the high order modulation scheme to the network device 102. The network device 102 may decide whether the TX terminal device 110-1 can use such a high order modulation scheme. If the network device 102 determines that the high order modulation scheme can be applied at the TX terminal device 110-1, it transmits (245) a confirmation feedback to the TX terminal device 110-1. Otherwise, the network device 102 may provide a feedback to prevent the TX terminal device 110-1 from using the high order modulation scheme.

In addition to the indication of the use of the high order modulation scheme, the TX terminal device 110-1 may additionally provide relevant information it obtained to the network device 102 to facilitate the network device 102 to make the decision. The relevant information may include the context of the TX terminal device 110-1, the RSRQs from the RTX terminal devices 102, . . . , 106, the resource pool and/or the geological zone of the TX terminal device 110-1, and/or the services producing the information to be broadcasted. In some examples, the TX terminal device 110-1 may not have to determine the modulation scheme but provide the relevant information to the network device 102 to enable the network device 102 to determine whether the TX terminal device 110-1 is allowed to use a high order modulation scheme.

Figure 4:
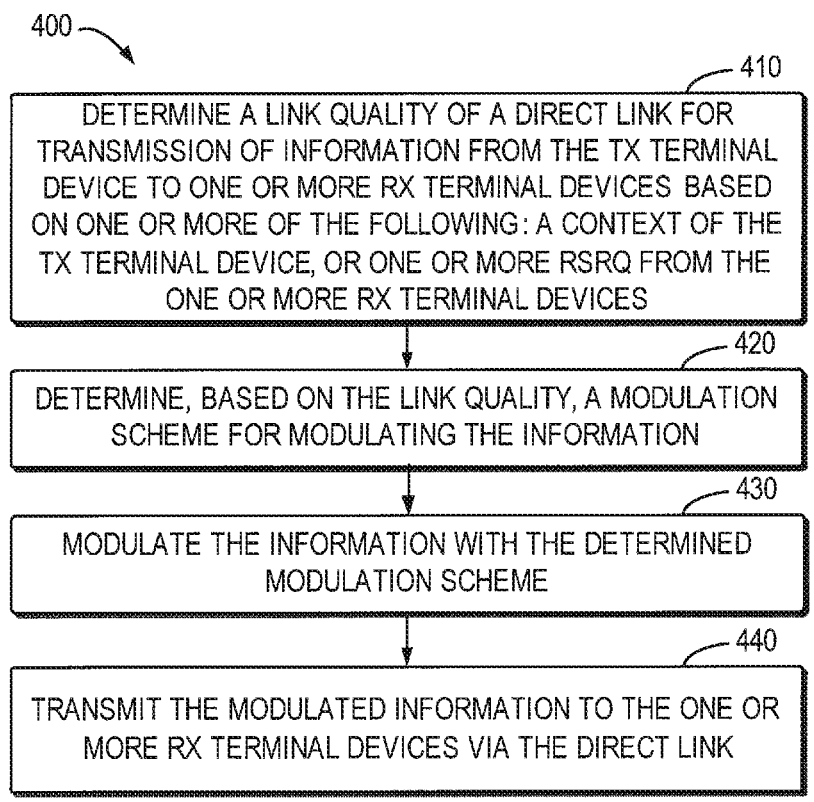
FIG. 4 shows a flowchart of an example method in accordance with some embodiments of the present disclosure.

FIG. 4 shows a flowchart of an example method 400 in accordance with some embodiments of the present disclosure. The method 400 can be implemented at a terminal device 110 as shown in FIG. 1 which has information to be transmitted. For the purpose of discussion, the method 400 will be described from the perspective of the TX terminal device 110 with reference to FIG. 1.

At block 410, the TX terminal device 110 determines a link quality of a direct link for transmission of information from the TX terminal device to one or more receiving, RX, terminal devices, based on one or more of the following: a context of the TX terminal device, or one or more reference signal received qualities, RSRQs, from the one or more RX terminal devices. At block 420, the TX terminal device 110 determines, based on the link quality, a modulation scheme for modulating the information. At block 430, the TX terminal device 110 modulates the information with the determined modulation scheme. At block 440, the TX terminal device 110 transmits the modulated information to the one or more RX terminal devices via the direct link.

In some embodiments, determining the modulation scheme may comprise in response to the link quality exceeding a threshold quality, determining a modulation scheme having an order higher than an order of 16 Quadrature Amplitude Modulation, 16QAM, scheme for modulating the information.

In some embodiments, determining the modulation scheme may comprise in response to the link quality exceeding a threshold quality, determining a modulation scheme having an order equal to or higher than an order of a 64QAM scheme for modulating the information.

In some embodiments, modulating the information with the determined modulation scheme may further comprise: in response to determining a modulation scheme having an order higher than an order of a 16QAM scheme, or in response to determining a modulation scheme having an order equal to or higher than an order of a 64QAM scheme, transmitting an indication of use of the modulation scheme to a network device serving the TX terminal device; and in response to receiving a confirmation from the network device, modulating the information with the determined modulation scheme.

In some embodiments, determining the modulation scheme may further comprise determining the modulation scheme further based on a resource pool for the transmission of the information.

In some embodiments, determining the modulation scheme further based on the resource pool may comprise: determining a modulation scheme having an order equal to or lower than an order of a 16QAM scheme for modulating the information based on determining that the resource pool is one of: a resource pool without sensing, a resource pool on a high frequency band, or a resource pool reserved for a legacy transmission.

In some embodiments, determining the modulation scheme further based on the resource pool may comprise: determining a modulation scheme having an order lower than an order of a 64QAM scheme for modulating the information based on determining that the resource pool is one of: a resource pool without sensing, a resource pool on a high frequency band, or a resource pool reserved for a legacy transmission.

In some embodiments, determining the modulation scheme may further comprise: determining the modulation scheme further based on one or more of a reliability requirement or a latency requirement for a service on the TX terminal device from which the information is originated.

In some embodiments, the context of the TX terminal device may include one or more of: a position of the TX terminal device; a speed of the TX terminal device; an acceleration of the TX terminal device; a propagation environment of the information from the TX terminal device; or a communication range required for the transmission of the information by the TX terminal device.

In some embodiments, the context of the TX terminal device may include the propagation environment, the method further comprising: receiving an indication from a network device serving the TX terminal device, the indication indicting the prorogation environment.

In some embodiments, the indication may indicate whether there is an object blocking propagation of the information from the TX terminal device to one of the one or more RX terminal devices.

In some embodiments, the method may further comprise: measuring candidate RSRQs from a plurality of candidate RX terminal devices; determining respective distances from the TX terminal device to the candidate RX terminal devices; identifying one or more of the plurality of candidate RX terminal devices having the determined distances within a communication range required for the transmission of the information; and determining one or more of the candidate RSRQs from the identified one or more candidate RX terminal devices as the one or more RSRQs.

In some embodiments, determining the respective distances may comprise: identifying resource pools in which receptions of reference signals from the plurality of candidate RX terminal devices are detected; determining a plurality of geological zones to which the resource pools are allocated; and determining the respective distances from the TX terminal device to the plurality of candidate RX terminal devices based on the determined geological zones.

It is to be understood that all operations and features related to the TX terminal device 110 described above with reference to FIGS. 2 and 3 are likewise applicable to the method 400 and have similar effects. For the purpose of simplification, the details will be omitted.

Figure 5:
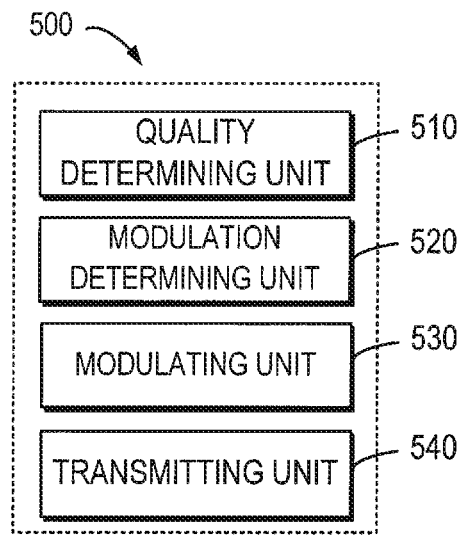
FIG. 5 is a block diagram of a TX terminal device in accordance with some embodiments of the present disclosure.

FIG. 5 shows a block diagram of a TX terminal device 500 in accordance with some embodiments of the present disclosure. The TX terminal device 500 can be considered as an example implementation of the TX terminal device 110 as shown in FIGS. 1 and 2. As shown, the TX terminal device 500 includes a quality determining unit 510 configured to determine a link quality of a direct link for transmission of information from the TX terminal device to one or more receiving, RX, terminal devices, based on one or more of the following: a context of the TX terminal device, or one or more reference signal received qualities, RSRQs, from the one or more RX terminal devices. The TX terminal device 500 also include a modulation determining unit 520 configured to determine, based on the link quality, a modulation scheme for modulating the information. The TX terminal device 110 further includes a modulating unit 530 configured to modulate the information with the determined modulation scheme, and a transmission unit 540 configured to transmit the modulated information to the one or more RX terminal devices via the direct link.

In some embodiments, the modulation determining unit 520 may be configured to, in response to the link quality exceeding a threshold quality, determine a modulation scheme having an order higher than an order of 16 Quadrature Amplitude Modulation, 16QAM, scheme for modulating the information.

In some embodiments, the modulation determining unit 520 may be configured to: in response to the link quality exceeding a threshold quality, determine a modulation scheme having an order equal to or higher than an order of a 664QAM scheme for modulating the information.

In some embodiments, the transmission unit 540 may be configured to, in response to determining a modulation scheme having an order higher than an order of a 16QAM scheme, or in response to determining a modulation scheme having an order equal to or higher than an order of a 64QAM scheme, transmit an indication of use of the modulation scheme to a network device serving the TX terminal device. The modulation determining unit 520 may be configured to, in response to receiving a confirmation from the network device, modulate the information with the determined modulation scheme.

In some embodiments, the modulation determining unit 520 may be further configured to determine the modulation scheme further based on a resource pool for the transmission of the information.

In some embodiments, the modulation determining unit 520 may be further configured to determine a modulation scheme having an order equal to or lower than an order of a 16QAM scheme for modulating the information based on determining that the resource pool is one of: a resource pool without sensing, a resource pool on a high frequency band, or a resource pool reserved for a legacy transmission.

In some embodiments, the modulation determining unit 520 may be further configured to determine a modulation scheme having an order lower than an order of a 64QAM scheme for modulating the information based on determining that the resource pool is one of: a resource pool without sensing, a resource pool on a high frequency band, or a resource pool reserved for a legacy transmission.

In some embodiments, the modulation determining unit 520 may be further configured to determine the modulation scheme further based on one or more of a reliability requirement or a latency requirement for a service on the TX terminal device from which the information is originated.

In some embodiments, the context of the TX terminal device may include one or more of a position of the TX terminal device; a speed of the TX terminal device; an acceleration of the TX terminal device; a propagation environment of the information from the TX terminal device; or a communication range required for the transmission of the information by the TX terminal device.

In some embodiments, the context of the TX terminal device includes the propagation environment. The TX terminal device 500 further includes a receiving unit configured to receive an indication from a network device serving the TX terminal device, the indication indicting the prorogation environment.

In some embodiments, the indication indicates whether there is an object blocking propagation of the information from the TX terminal device to one of the one or more RX terminal devices.

In some embodiments, the TX terminal device 500 may further include: a measuring unit configured to measure candidate RSRQs from a plurality of candidate RX terminal devices; a distance determining unit configured to determine respective distances from the TX terminal device to the candidate RX terminal devices; an identifying unit configured to identify one or more of the plurality of candidate RX terminal devices having the determined distances within a communication range required for the transmission of the information; and a RSRQ determining unit configured to determine one or more of the candidate RSRQs from the identified one or more candidate RX terminal devices as the one or more RSRQs.

In some embodiments, the distance determining unit may be configured to: identify resource pools in which receptions of reference signals from the plurality of candidate RX terminal devices are detected; determine a plurality of geological zones to which the resource pools are allocated; and determine the respective distances from the TX terminal device to the plurality of candidate RX terminal devices based on the determined geological zones.

It should be appreciated that units included in the device 500 corresponds to the blocks of the process 200 as well as the method 400. Therefore, all operations and features described above with reference to FIGS. 2 to 4 are likewise applicable to the units included in the device 500 and have similar effects. For the purpose of simplification, the details will be omitted.

The units included in the device 500 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the device 500 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 6:
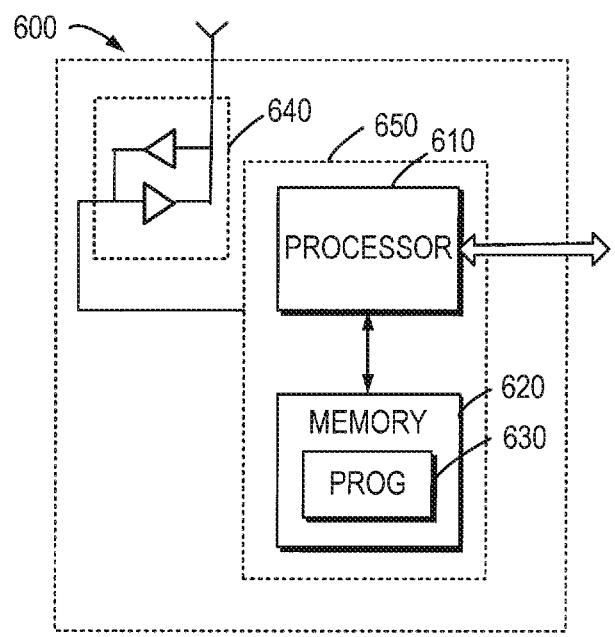
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the TX terminal device 110 as shown in FIGS. 1 and 2. Accordingly, the device 600 can be implemented at or as at least a part of the TX terminal device 110.

As shown, the device 600 includes a processor or processing unit 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S interface for communication between a Mobility Management Entity (MME)/Serving Gateway (S-GW) and the eNB, Un interface for communication between the eNB and a relay node (RN), or Uu interface for communication between the eNB and a terminal device. The device 600 may also enable direct V2X communication with other terminal devices.

The program 630 is assumed to include program instructions that, when executed by the associated processor 610, enable the device 600 to operate in accordance with the embodiments of the present disclosure, as discussed herein with reference to FIGS. 2 to 5. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2, 6, and 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a transmitting (TX) terminal device of a vehicle, comprising:
    determining a link quality of a direct communication link utilized as a sidelink between the TX terminal device and one or more receiving (RX) terminal devices for transmission of information from the TX terminal device to the one or more RX terminal devices by vehicle-to-device communication, wherein the link quality is determined based on a context of the TX terminal device, wherein the context of the TX terminal device is based partly on an indication received from a network device serving the TX terminal device, the indication indicating a propagation environment for transmission of the information from the TX terminal device, including whether there is an object blocking propagation of the information from the TX terminal device to one of the one or more RX terminal device;
    determining, based on the link quality, a modulation scheme for modulating the information;
    modulating the information with the determined modulation scheme; and
    broadcasting the modulated information to the one or more RX terminal devices via the direct communication link by the vehicle-to-device communication.

2. The method of claim 1, wherein the determining the modulation scheme comprises:
    in response to the link quality exceeding a threshold quality, determining a modulation scheme having an order higher than an order of 16 Quadrature Amplitude Modulation (QAM) scheme for modulating the information; or
    in response to the link quality exceeding a threshold quality, determining a modulation scheme having an order equal to or higher than an order of a 64QAM scheme for modulating the information.

3. The method of claim 2, wherein the modulating the information with the determined modulation scheme further comprises:
    in response to determining a modulation scheme having an order higher than an order of a 16 Quadrature Amplitude Modulation (QAM) scheme, or in response to determining a modulation scheme having an order equal to or higher than an order of a 64QAM scheme, transmitting an indication of use of the modulation scheme to a network device serving the TX terminal device; and
    in response to receiving a confirmation from the network device, modulating the information with the determined modulation scheme.

4. The method of claim 1, wherein the determining the modulation scheme further comprises:
    determining the modulation scheme further based on a resource pool for the transmission of the information; or
    determining the modulation scheme further based on one or more of a reliability requirement and a latency requirement for a service on the TX terminal device from which the information is originated.

5. The method of claim 4, wherein the determining the modulation scheme further based on the resource pool comprises:
    determining a modulation scheme having an order equal to or lower than an order of a 16 Quadrature Amplitude Modulation (QAM) scheme, or determining a modulation scheme having an order lower than an order of a 64QAM scheme, for modulating the information based on determining that the resource pool is one of:
        a resource pool without sensing,
        a resource pool on a high frequency band, or
        a resource pool reserved for a legacy transmission.

6. The method of claim 1, wherein the context of the TX terminal device is further based on one or more of:
    a position of the TX terminal device;
    a speed of the TX terminal device;
    an acceleration of the TX terminal device; and
    a communication range required for the broadcast of the information by the TX terminal device.

7. An apparatus at a transmitting (TX) terminal device of a vehicle, comprising:
    a processing unit; and
    a memory coupled to the processing unit and storing instructions thereon, the instructions, when executed by the processing unit, cause the apparatus to:
        determine a link quality of a direct communication link utilized as a sidelink between the TX terminal device and one or more receiving (RX) terminal devices for transmission of information from the TX terminal device to the one or more RX terminal devices by vehicle-to-device communication, wherein the link quality is determined based on a context of the TX terminal device, wherein the context of the TX terminal device is based partly on an indication received from a network device serving the TX terminal device, the indication indicating a propagation environment for transmission of the information from the TX terminal device, including whether there is an object blocking propagation of the information from the TX terminal device to one of the one or more RX terminal device;
        determine, based on the link quality, a modulation scheme for modulating the information;
        modulate the information with the determined modulation scheme; and
        broadcast the modulated information to the one or more RX terminal devices via the direct communication link by vehicle-to-device communication.

8. The apparatus of claim 7, wherein the instructions, when executed by the processing unit, cause the apparatus to:
    in response to the link quality exceeding a threshold quality, determine a modulation scheme having an order higher than an order of 16 Quadrature Amplitude Modulation (QAM) scheme for modulating the information; or
    in response to the link quality exceeding a threshold quality, determine a modulation scheme having an order equal to or higher than an order of a 64QAM scheme for modulating the information.

9. The apparatus of claim 8, wherein the instructions, when executed by the processing unit, cause the apparatus to:
    in response to determining a modulation scheme having an order higher than an order of a 16 Quadrature Amplitude Modulation (QAM) scheme, or in response to determining a modulation scheme having an order equal to or higher than an order of a 64QAM scheme, transmit an indication of use of the modulation scheme to a network device serving the TX terminal device; and
    in response to receiving a confirmation from the network device, modulate the information with the determined modulation scheme.

10. The apparatus of claim 7, wherein the instructions, when executed by the processing unit, further cause the apparatus to:
- determine the modulation scheme further based on a resource pool for the transmission of the information; or
- determine the modulation scheme further based on one or more of a reliability requirement and a latency requirement for a service on the TX terminal device from which the information is originated.

11. The apparatus of claim 10, wherein the instructions, when executed by the processing unit, cause the apparatus to:
- determine a modulation scheme having an order equal to or lower than an order of a 16 Quadrature Amplitude Modulation (QAM) scheme, or determine a modulation scheme having an order lower than an order of a 64QAM scheme, for modulating the information based on determining that the resource pool is one of:
  - a resource pool without sensing,
  - a resource pool on a high frequency band, or
  - a resource pool reserved for a legacy transmission.

12. The apparatus of claim 7, wherein the context of the TX terminal device is further based on one or more of:
- a position of the TX terminal device;
- a speed of the TX terminal device;
- an acceleration of the TX terminal device; and
- a communication range required for the broadcast of the information by the TX terminal device.

* * * * *